United States Patent [19]

Ciocan

[11] Patent Number: 4,705,992
[45] Date of Patent: Nov. 10, 1987

[54] SYSTEM FOR STABILIZING CATHODE EMISSIONS WITH AN IN-LINE GUN CATHODE RAY TUBE

[75] Inventor: Dan N. Ciocan, Rowland Heights, Calif.

[73] Assignee: Conrac Corporation, Stamford, Conn.

[21] Appl. No.: 800,455

[22] Filed: Nov. 21, 1985

[51] Int. Cl.$^4$ ............................................. H01J 29/52
[52] U.S. Cl. .................................... 315/383; 358/168
[58] Field of Search ................ 315/383; 358/168, 169, 358/219

[56] References Cited

U.S. PATENT DOCUMENTS

| | | | |
|---|---|---|---|
| 4,461,983 | 7/1984 | Lees | 315/383 |
| 4,506,292 | 3/1985 | Newton et al. | 358/168 |
| 4,514,664 | 4/1985 | Kasagi et al. | 315/383 |
| 4,525,653 | 6/1985 | Smith | 315/383 |

Primary Examiner—Theodore M. Blum
Attorney, Agent, or Firm—Kendrick, Netter & Bennett

[57] ABSTRACT

A system for stabilizing the cathode emissions of an in-line gun cathode ray tube includes subsystems functionally identical to one another linked to each of the cathodes of an in-line gun cathode ray tube. During the time that the CRT beam is retracing vertically, each subsystem imposes a fixed, predetermined voltage on a cathode in the cathode ray tube, samples the current flowing to the cathode, compares the sampled current to a predetermined, desired reference current for the cathode, develops a differential signal representing the difference, if any, between the sampled current and the reference current, and then drives the current flowing to the cathode from its actual value to its predetermined, reference value so as to maintain a predetermined, desired ratio of the currents flowing to each of the cathodes.

24 Claims, 5 Drawing Figures

SYSTEM FOR STABILIZING CATHODE EMISSIONS WITH AN IN-LINE GUN CATHODE RAY TUBE

This invention relates to a system for stabilizing the cathode emissions from an in-line gun cathode ray tube and for maintaining the ratio of the beam currents in the cathodes within a predetermined desired range. The system includes a subsystem that can be linked to each of the cathodes of an in-line gun or delta gun CRT comprising means for interrupting the flow of a video signal to the cathodes of a cathode ray tube; means for imposing a predetermined test signal on each or any of the cathodes; means for detecting the actual current flowing to each or any of the cathodes of a cathode ray tube independently of the others; means for sampling the actual current; means for detecting the difference between the sampled actual current and a predetermined, desired current; means for developing a signal representing the difference, if any, between the sampled actual current and the predetermined current; and means for using the differential signal to drive the actual current to the predetermined value.

The means for interrupting the flow of the video signal of the cathode to the cathode ray tube comprises means for opening and closing the switch means operatively linked to means for charging and discharging the capacitance of the load, namely the CRT, and, alternatively, for interrupting the charging and discharging and for sampling current to the load. This interrupting means is particularly effective where the signals passing through the interrupting means have a high voltage and a high frequency, meaning, for example, signals of at least about 50 volts and of more than one megaHertz, and particularly signals of five or more megaHertz. This interrupting means exhibits good frequency response with little signal loss for signals having both a high voltage and a high frequency. In preferred embodiments, the means for opening and closing the switch means is an optocoupler, and the charging and discharging means comprises a pair of bipolar transistors linked emitter-to-collector. In the systems of this invention, the switch means comprises an optocoupler linked to a pair of bipolar transistors that are linked to one another emitter-to-collector. The transistors include means for connecting the transistor pair in series to at least one gun of a cathode ray tube at one end, and to the output of a video signal amplifier at the other end, as well as means for connecting the pair in parallel to a current sampling means.

This system is both highly accurate and highly efficient. The system draws very little current, and then only during the testing cycle. Because the system can, and preferably does function during each vertical retracing of the electron beam, the system does not interfere with the video signal during horizontal scanning of the CRT, yet acts to correct for drift on each vertical retracing of the beam.

The invention can better be understood by reference to the enclosed drawings in which.

Figure 1:
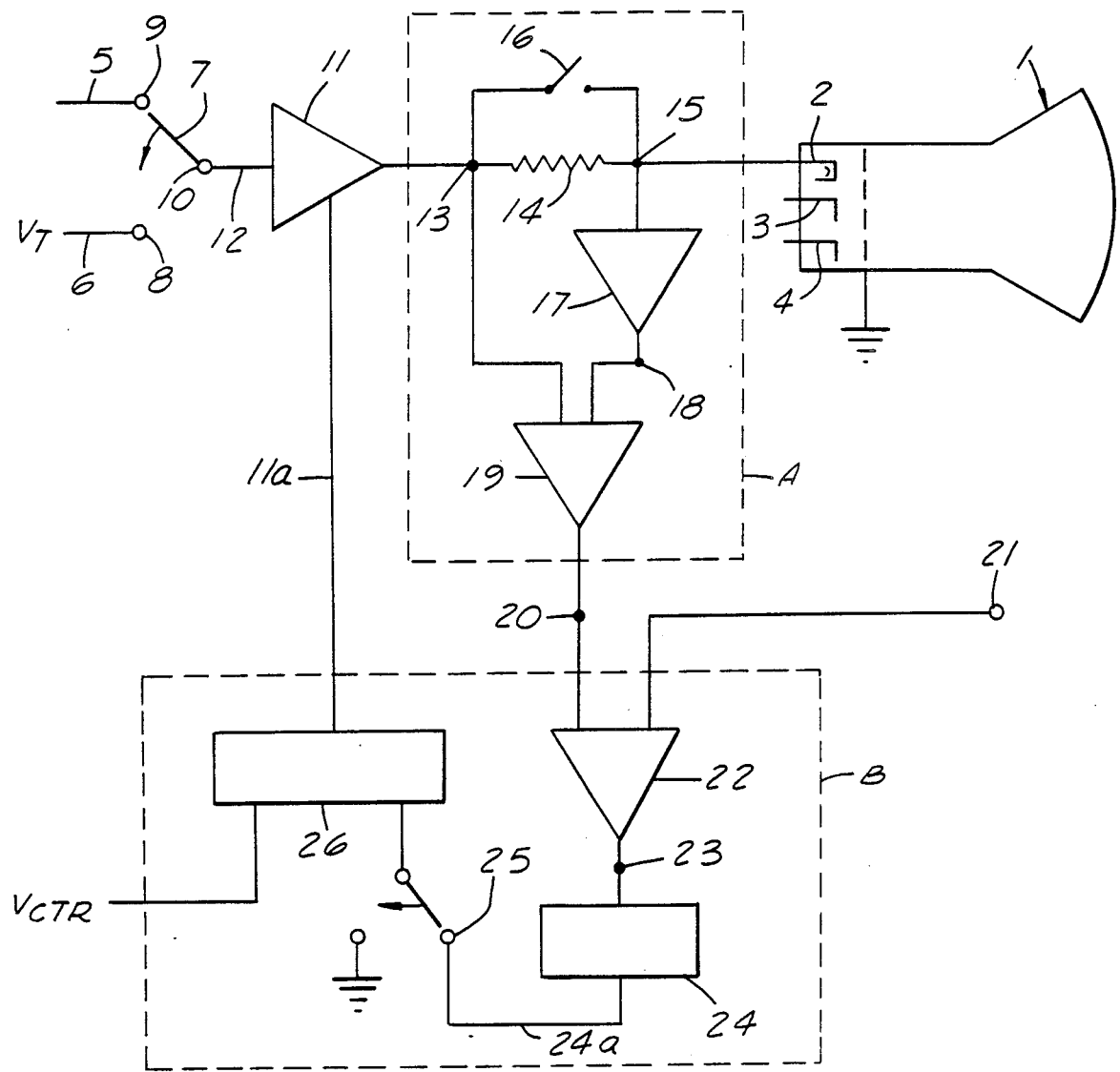
FIG. 1 is a block function diagram illustrating the preferred embodiment of the new system.

Referring now to FIG. 1, the preferred embodiment of the new system includes, linked to each of the cathodes of the cathode ray tube designated 1, the subsystem pictured to the left of CRT 1 in FIG. 1. FIG. 1 illustrates only one of the three functionally-identical subsystems linked to each of the cathodes of CRT 1. However, for purposes of simplicity, FIG. 1 illustrates only the subsystem linked to cathode 2 in in-line gun cathode ray tube 1.

In operation, the subsystem shown in FIG. 1, and the counterpart subsystems linked to each of cathodes 3 and 4, operate only during the time that the beam in cathode ray tube 1 is retracing vertically. During that time, the video signal on path 5 is interrupted by throwing switch 7 to contact 8 from position 9. With the switch thrown to contact 8, a predetermined or standard voltage $V_T$ causes current flow through contact 10, path 12, cathode ray tube amplifier 11, contact 13, resistor 14, and contact 15 to cathode 2. During part of the time ($T_1$) that switch 7 is thrown to contact 8, switch 16 is open, and remains open while the subsystem illustrated in FIG. 1 operates. (Part of the time ($T_0$) during vertical retracing, switch 16 remains closed while differential amplifier 19 undergoes auto-zeroing, as explained hereafter.) Switch 16 closes during the normal flow of a video signal to cathode ray tube 1. Switch 16 opens in response to a signal triggered by the vertical retracing of the beam current in cathode ray tube 1 by known means.

The voltage at contact point 15 is buffered by high input impedance buffer means 17. The voltage across resistor 14 is sensed by means of differential amplifier 19, and delivered at contact 20 as a voltage representing the current flowing through CRT cathode 2. The desired reference current is imposed at contact 21, and the difference between the voltages at contacts 20 and 21, is, by means of differential amplifier 22, developed as a differential signal at contact point 23. The differential signal at contact point 23 flows to sample and hold means 24, and, from there, on path 24a, to contact 25 and through analog summing means generally designated 26 and path 11a to amplifier 11 where the differential signal drives the actual current flowing through resistor 14 and cathode 2 to the desired current imposed at contact point 21.

Figure 2:
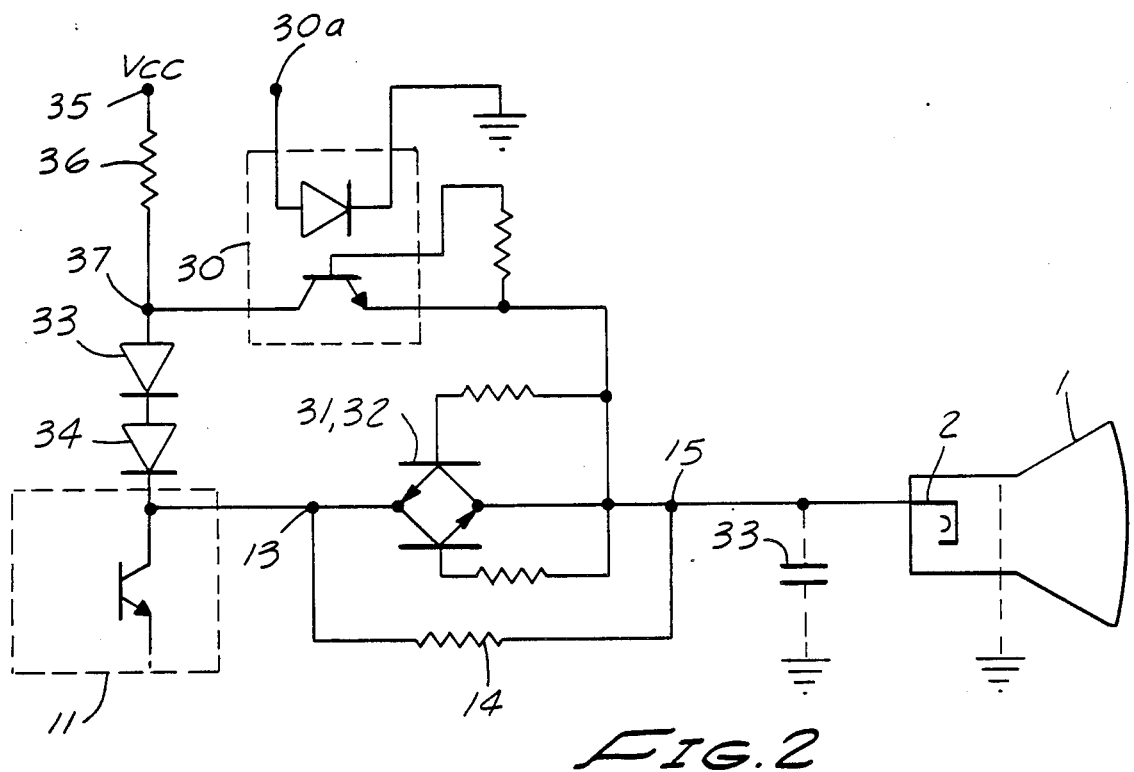
FIG. 2 is a schematic diagram of the preferred embodiment of the switch 16 depicted in FIG. 1.

FIG. 2 illustrates the preferred embodiment of electronic switch 16. Optocoupler 30 is activated at input 30a by known means. (One suitable commercially-available optocoupler is model No. 4N37 from Motorola.) During normal operation, optocoupler 30 is driven on. In effect, transistors 31 and 32 are saturated, making switch 16 closed and bypassing resistor 14. During retrace (actually first scanning line after retrace is over), the voltage at node 30a is driven low, the optocoupler turns off, driving transistors 31 and 32 into the cut-off region. Voltage source 35, resistor 36 and diodes 33 and 34 provide the necessary power to drive transistors 31 and 32. When this happens, switch 16 is opened and current flows from node 13 through resistor 14, node 15 and cathode 2.

The switch means shown in FIG. 2 is itself new. As can be seen from the drawing, the switch is insulated from ground, operates very fast, conducts both ways to permit rapid charging and discharging of stray, parasitic capacitor 33, presents a low capacitance to ground to avoid affecting the amplifier frequency response, and is preferably driven by a TTL (transistor-transistor logic).

Figure 3:
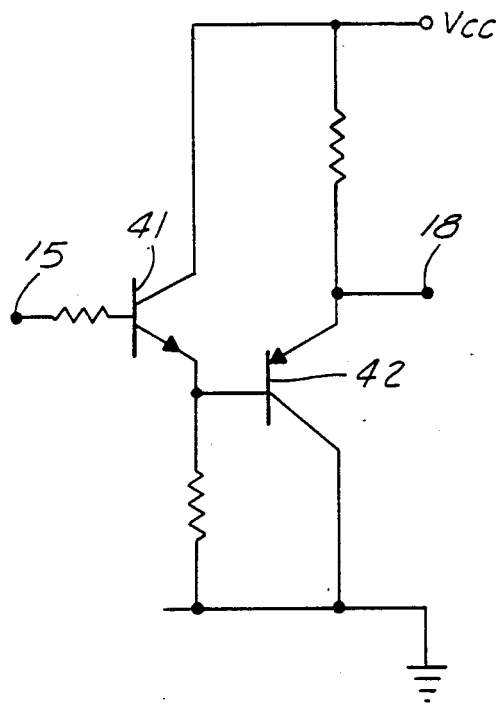
FIG. 3 is a schematic diagram of the buffer illustrated in FIG. 1.

FIG. 3 illustrates the preferred embodiment of buffer 17 in FIG. 1. As FIG. 3 shows, buffer 17 must draw very low current because the measured current flowing through resistor 14 can be in the range of 10 microamperes. The transistors 41 and 42 in buffer 17 should accordingly have good DC current gain ($h_{FE}$), say, 50, at a minimum, at very low levels of collector current. The buffer also has good low DC offset and low drift characteristics.

Figure 4:
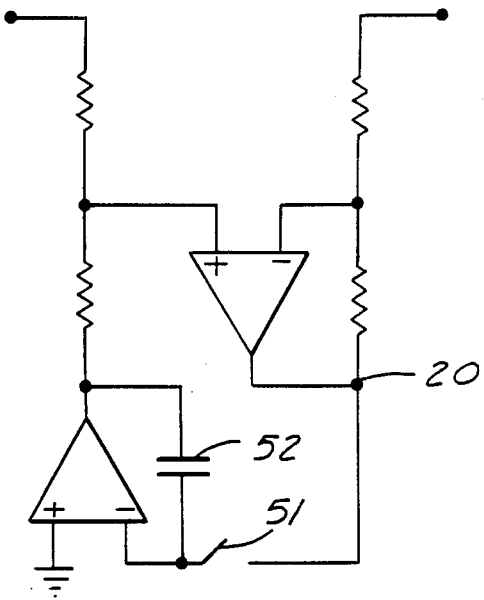
FIG. 4 is a schematic diagram of the preferred embodiment of the differential amplifier illustrated in FIG. 1.

FIG. 4 illustrates the preferred embodiment of the differential amplifier 19 in FIG. 1. Although the system can use high voltage operational amplifiers, such amplifiers are very expensive. Because this differential amplifier must work at 100 or more volts common mode voltage, the amplifier must exhibit good CMR (common mode rejection). To this end, the circuit of FIG. 4 uses an auto-zeroing scheme. Capacitor 52 in the circuit serves as an integrating capacitor when the loop is working and a storage capacitor when the switch 51 is open. The error at differential signal contact point 20 reflects only the voltage offset of operational amplifier 11 increased by the charge transferred on the capacitor when switch 51 is turned off.

Figure 5:
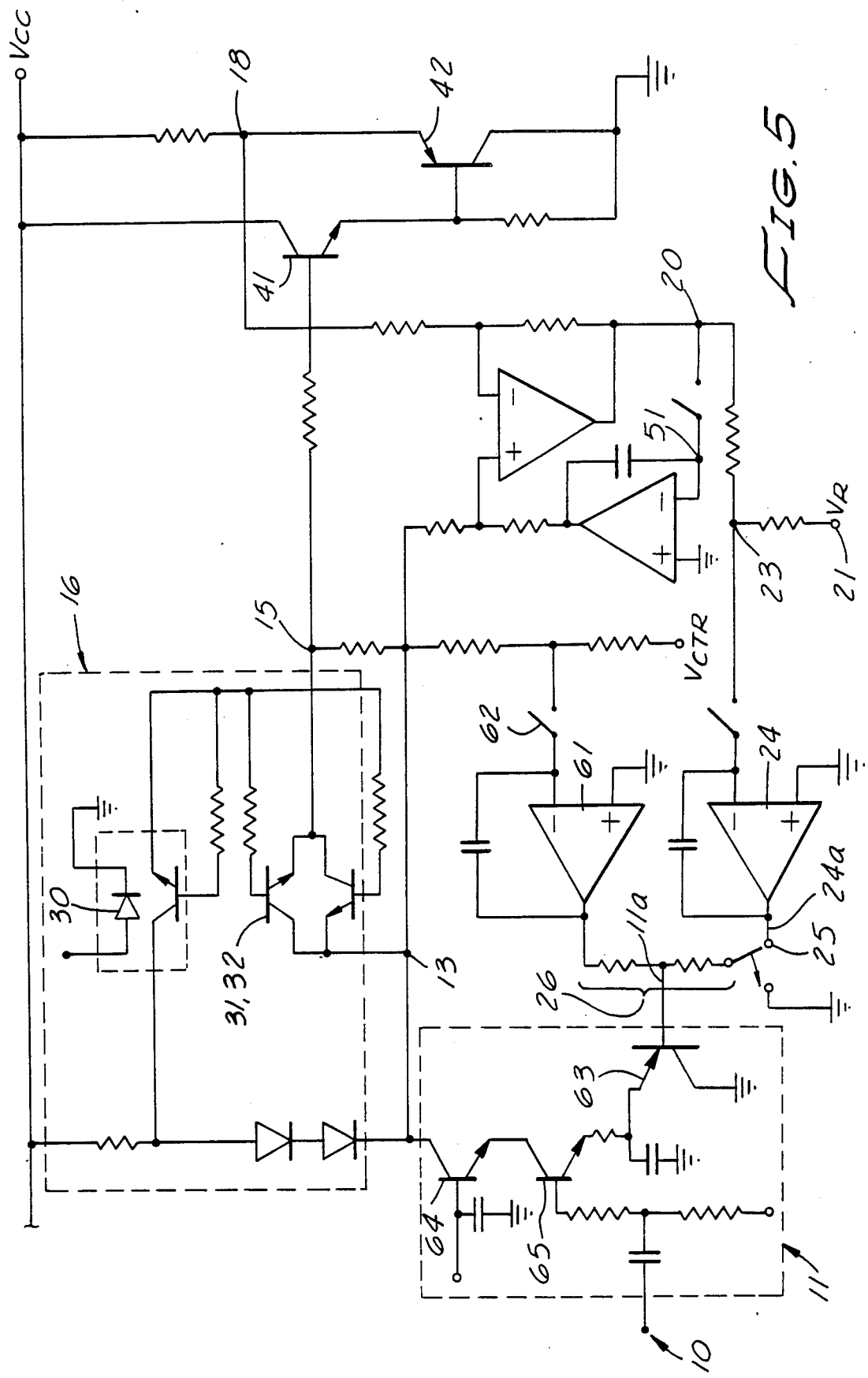
FIG. 5 is a detailed schematic wiring diagram of the preferred embodiment illustrated in FIG. 1.

As can be seen in FIG. 5, which is a detailed schematic of the whole circuit shown in block function form in FIG. 1, differential amplifier 11 performs the comparison function. Any kind of integral or proportional regulator can be used. In the embodiment shown in FIG. 5, transistors 64 and 65 comprise a cascode amplifier. PNP transistor 63 provides a means for controlling DC bias with a cascode amplifier stage.

The sample and hold circuit illustrated in both FIGS. 1 and 5 closes the loop only during the time denoted as $T_1$ on the drawings, which is the time the beam in the CRT is retracing vertically. Amplifier 61 and switch 62 perform a clamping at horizontal scanning rate during retracing of the beam in CRT 1. The purpose is to update the DC bias at the output stage of amplifier 11 to compensate for low frequency distortion inherent in an AC amplifier such as amplifier 11.

Mechanical switch 25 in FIG. 5 is normally in the ungrounded position as shown in FIG. 5. Switch 25 is thrown to ground only when the loop is being calibrated.

The voltage $V_R$ at contact point 21 defines the desired current level to the CRT when the constant test voltage $V_t$ is applied at the input 5.

$V_{CTR}$ is the voltage controlling the CRT bias. Either $V_R$ or $V_{CTR}$ can be made adjustable to color balance the CRT.

What is claimed is:

1. A system for stabilizing cathode emissions in a cathode ray tube comprising at least one video signal amplifier; means linked in series between the output of said at least one video signal amplifier and at least one cathode of said tube for interrupting the flow of a video signal to said tube during a test period; means for impressing a test signal of predetermined value on at least one of the cathodes of said tube; means for sampling the actual current of the test signal flowing to said at least one cathode in said tube, said sampling means being linked in parallel to said interrupting means; means for developing a differential signal representing the difference between the actual current flowing to said at least one cathode during a test period and a predetermined current to be flowing to said at least one cathode; and means for utilizing said differential signal to drive the actual current flowing to said at least one cathode to said predetermined desired value.

2. The system of claim 1 wherein said tube is an in-line gun cathode ray tube.

3. The system of claim 1 wherein said tube is a delta gun cathode ray tube.

4. The system of claim 1 further comprising switch means for effecting said interrupting, said switch means comprising an optocoupler linked to a pair of transistors, said pair of transistors being adapted to conduct said video signal when activated by a signal from said optocoupler, and to block said video signal when deactivated by a signal from said optocoupler.

5. The system of claim 4 wherein said tube is an in-line gun cathode ray tube.

6. The system of claim 4 further comprising means for sampling the actual current flowing to said at least one cathode when said switch means is open and means for developing a signal representing the difference, if any, between said test signal and said actual current.

7. A system for stabilizing cathode emissions in a cathode ray tube comprising at least one video signal amplifier; means linked in series between the output of said at least one video signal amplifier and at least one cathode of said tube for interrupting the flow of a video signal to said tube; means for impressing a test signal of predetermined value on at least one of the cathodes of said tube; means for sampling the actual current of the test signal flowing to said at least one cathode in said tube, said sampling means being linked in parallel to said interrupting means; and means for developing a differential signal representing the difference between the actual current flowing to said at least one cathode during a test period and a desired, predetermined current to be flowing to said at least one cathode.

8. The system of claim 7 wherein said tube is an in-line gun cathode ray tube.

9. The system of claim 7 wherein said tube is a delta gun cathode ray tube.

10. The system of claim 7 further comprising switch means for effecting said interrupting, said switch means comprising an optocoupler linked to a pair of transistors, said pair of transistors being adapted to conduct said video signal when activated by a signal from said optocoupler, and to block said video signal when deactivated by a signal from said optocoupler.

11. The system of claim 10 wherein said tube is an in-line gun cathode ray tube.

12. The system of claim 10 further comprising means for sampling the actual current flowing to said at least one cathode when said switch means is open and means for developing a signal representing the difference, if any, between said test signal and said actual current.

13. A system comprising switch means adapted to be linked in series between the output of at least one video signal amplifier and at least one cathode of a cathode ray tube, including means for opening and closing said switch means, and means for charging and discharging the capacitance of a load, and, alternatively, for interrupting said charging and discharging; and means for sampling current flowing to said load, said sampling means being linked in parallel to said switch means.

14. The switch means of claim 13 wherein said opening and closing means comprises an optocoupler, and said charging and discharging means comprises a pair of bipolar transistors linked emitter-to-collector, means for connecting said transistors in series between at least one gun of a cathode ray tube, and the output of a video signal amplifier, and means for connecting said transistors in parallel to current sampling means.

15. The system of claim 1 further comprising switch means for effecting said interrupting, said switch means comprising transistor means adapted to conduct said video signal when said transistors are activated, and to block said video signal when said transistors are deactivated.

16. The system of claim 15 further comprising means for delivering activation and deactivation signals to said transistor means.

17. The system of claim 16 wherein said signal delivering means comprises an optocoupler means.

18. The system of claim 7 further comprising switch means for effecting said interrupting, said switch means comprising transistor means adapted to conduct said video signal when said transistors are activated, and to block said video signal when said transistors are deactivated.

19. The system of claim 7 further comprising means for delivering activation and deactivation signals to said transistor means.

20. The system of claim 19 wherein said signal delivering means comprises an optocoupler means.

21. A system for stabilizing cathode emissions in a cathode ray tube comprising at least one video signal amplifier; means linked in series between the output of said at least one video signal amplifier and at least one cathode of said tube for interrupting the flow of a video signal to said tube during a test period; means for impressing a test signal of predetermined value on at least one of the cathodes of said tube; means for sampling the actual current of the test signal flowing to said at least one cathode in said tube, said sampling means being linked in parallel to said interrupting means; and means for utilizing the sampled actual current and a predetermined, desired current to be flowing to said at least one cathode to drive the actual current flowing to said at least one cathode to said predetermined, desired value.

22. The system of claim 21 further comprising switch means for effecting said interrupting, said switch means comprising transistor means adapted to conduct said video signal when said transistors are activated, and to block said video signal when said transistors are deactivated.

23. The system of claim 22 further comprising means for delivering activation and deactivation signals to said transistor means.

24. The system of claim 23 wherein said signal delivering means comprises an optocoupler means.

* * * * *